United States Patent
Sherrill et al.

(10) Patent No.: US 8,225,337 B2
(45) Date of Patent: Jul. 17, 2012

(54) APPLICATION PROGRAMMING INTERFACE ENHANCEMENT

(75) Inventors: Justin L. Sherrill, Raleigh, NC (US);
Devan C. Goodwin, Hailfax (CA);
Parthasarathy M. Aji, Raleigh, NC (US); Jesus M. Rodriguez, Wake Forest, NC (US)

(73) Assignee: Red Hat, Inc., Raleigh, NC (US)

( * ) Notice: Subject to any disclaimer, the term of this patent is extended or adjusted under 35 U.S.C. 154(b) by 976 days.

(21) Appl. No.: 12/201,421

(22) Filed: Aug. 29, 2008

(65) Prior Publication Data

US 2010/0058364 A1 Mar. 4, 2010

(51) Int. Cl.
*G06F 13/00* (2006.01)
(52) U.S. Cl. ...................... 719/328; 719/330
(58) Field of Classification Search .............. 719/328, 719/330
See application file for complete search history.

(56) References Cited

U.S. PATENT DOCUMENTS

| | | | |
|---|---|---|---|
| 6,757,899 B2 * | 6/2004 | Zhdankin et al. | 719/315 |
| 7,139,811 B2 * | 11/2006 | Lev Ran et al. | 709/217 |
| 2008/0154981 A1 * | 6/2008 | Bezukov | 707/203 |

OTHER PUBLICATIONS

The J2EE Tutorial, "What is a Servlet?", 1 page.

* cited by examiner

*Primary Examiner* — Andy Ho
(74) *Attorney, Agent, or Firm* — Lowenstein Sandler PC

(57) ABSTRACT

Some embodiments of application programming interface (API) enhancement in a networked system have been presented. In one embodiment, a servlet is initialized on a centralized server in the networked system. The capabilities of an application programming interface (API) accessible by the client are expanded to allow the client to have data converted to a predetermined format when executing an automation script in order to perform an administrative task on multiple computing machines in the networked system without user intervention.

20 Claims, 5 Drawing Sheets

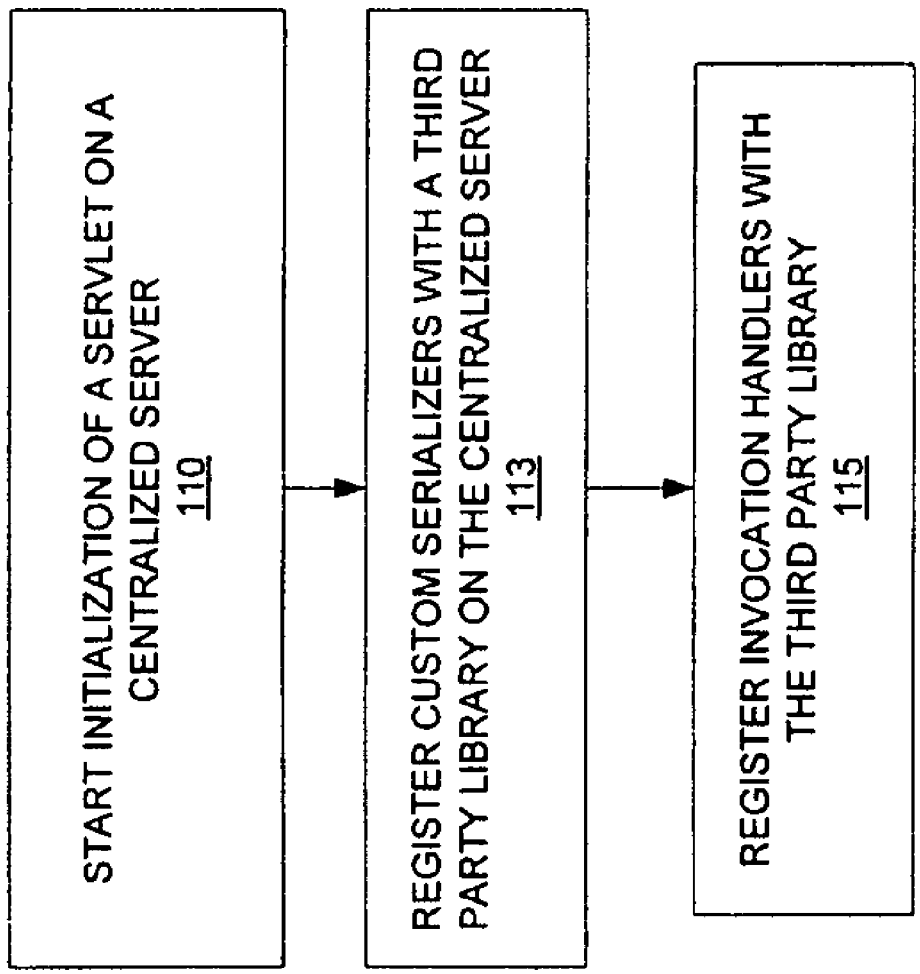

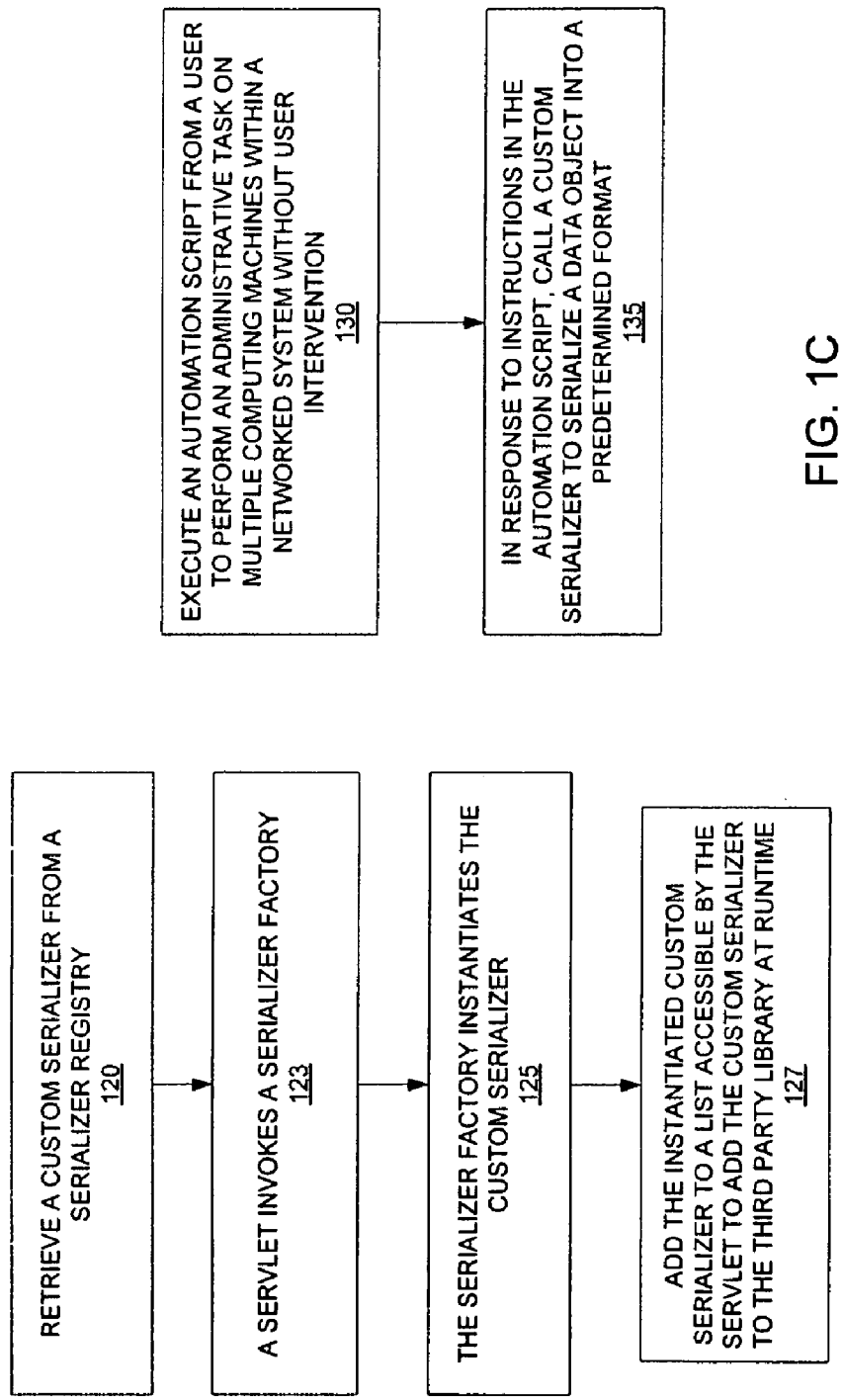

APPLICATION PROGRAMMING INTERFACE ENHANCEMENT

TECHNICAL FIELD

Embodiments of the present invention relate to application programming interface (API), and more specifically to API enhancement in a networked environment.

BACKGROUND

Conventionally, a software vendor may deploy a server to a customer's internal network to manage and to maintain software licensed to the customer. Typically, the server provides a web-based graphical user interface (GUI) to allow an administrator of the internal network to perform administrative tasks, such as creating provisioning profiles, configuring and initializing computing machines, installing software, etc. Through the web-based GUI, the administrator is given indirect access to the data and functions of the software provided by the software vendors.

Although conventional web-based GUI is generally easy to use because of the user-friendly nature of GUI, the conventional web-based GUI typically limits the way the administrator may interact with the underlying software. For example, the conventional web-based GUI limits the type and format of data to be input via the conventional web-based GUI in order to allow the API to forward the data input via the GUI to the underlying software. The administrator does not have direct access to the underlying software. As a result, the administrator cannot automate the performance of many routine administrative tasks using the conventional web-based GUI. For customers having a large number of computing machines in the internal network, it takes a long time for the administrator to perform many routine administrative tasks on all of the computing machines.

BRIEF DESCRIPTION OF THE DRAWINGS

The present invention is illustrated by way of example, and not by way of limitation, in the figures of the accompanying drawings and in which:

FIG. 1A illustrates one embodiment of a method to initialize a servlet.

FIG. 1B illustrates one embodiment of a method to register a custom serializer.

FIG. 1C illustrates one embodiment of a method to automate administrative tasks in a networked environment.

DETAILED DESCRIPTION

Figure 2:
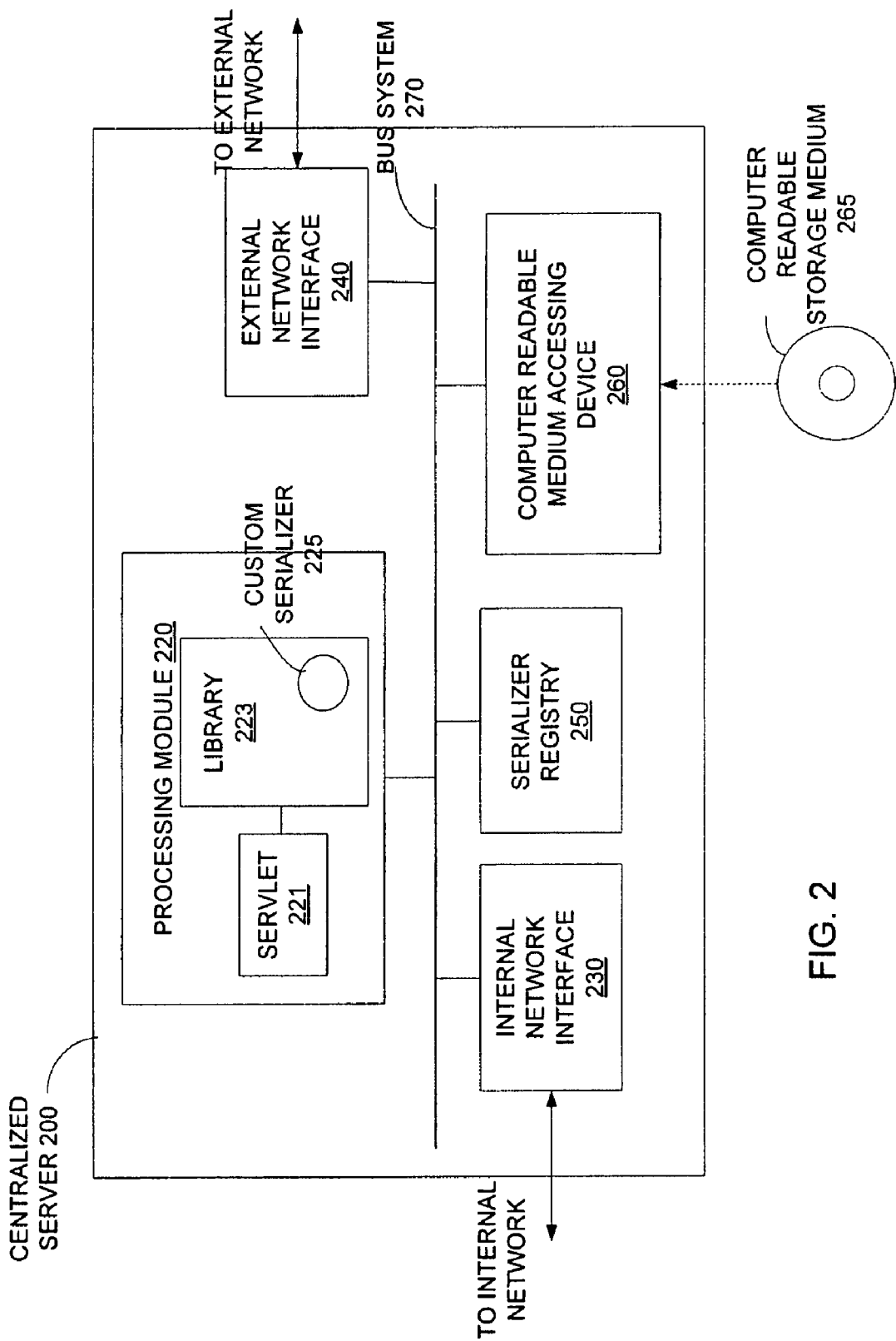
FIG. 2 illustrates a functional block diagram of one embodiment of a centralized server.

Described herein are some embodiments of application programming interface (API) enhancement in a networked system. In one embodiment, a servlet is initialized on a centralized server in the networked system. As used herein, a servlet broadly refers to a programming language class used to extend the capabilities of servers that host applications accessed via a request-response programming model, such as a Java servlet. A list of capabilities of an API accessible by the client is expanded to allow for enhanced integration and centralized automation of various system management capabilities in the networked system. The API may be based on extended markup language remote procedure calls (XML-RPCs), which allow distinct pieces of software on disparate systems to make remote procedure calls (RPCs) using extended markup language (XML) over hypertext transfer protocol (HTTP). In some embodiments, the capabilities of the API are extended to convert data into one or more predetermined formats. For example, custom data converters (e.g., a custom serializer) may be made available to the servlet. As such, the servlet may readily integrate with or interact with other scripts and/or programs.

In some embodiments, the API with the extended capabilities allows users to write automation scripts to perform many administrative tasks in bulk, which are available only in web-based graphical user interface (GUI) previously. In one embodiment, a custom serializer is registered with a library to allow the servlet to call the custom serializer when executing instructions in an automation script. The library may include a third party library. The custom serializer may convert data into a serialized format consumable by the servlet. In response to executing instructions in the automation script, the servlet may perform an administrative task on multiple computing machines in the networked system without user intervention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages maybe used to implement the teachings of the invention as described herein.

FIG. 1A illustrates one embodiment of a method to initialize a servlet. The method may be performed by processing logic that may comprise hardware (e.g., circuitry, dedicated logic, programmable logic, microcode, etc.), software (such as instructions run on a processing device), firmware, or a combination thereof For example, the processing module 220 of the centralized server 200 shown in FIG. 2 may perform at least part of the method.

Initially, processing logic starts initialization of a servlet on a centralized server in a networked system (processing block 110). Details of one embodiment of the centralized server and one embodiment of the networked system are discussed below with reference to FIGS. 2 and 3. During initialization, processing logic registers one or more custom serializers with a third party library (processing block 113). In some embodiments, processing logic further registers one or more invocation handlers with the third party library (processing block 115). By making the custom serializers available to the servlet, the capabilities of an API on the centralized server may be extended. Specifically, the servlet may call the custom serializer to convert the data into some predetermined format. As such, the servlet may better integrate with other scripts and/or program. Furthermore, the servlet may execute automation scripts to perform many administrative tasks without user intervention. Details of one embodiment of a process to register a custom serializer are discussed below with reference to FIG. 1B.

FIG. 1B illustrates one embodiment of a method to register a custom serializer. The method may be performed by processing logic that may comprise hardware (e.g., circuitry, dedicated logic, programmable logic, microcode, etc.), software (such as instructions run on a processing device), firmware, or a combination thereof For example, the processing module 220 of the centralized server 200 shown in FIG. 2 may perform at least part of the method.

Initially, processing logic retrieves a custom serializer from a serializer registry (processing block 120). In some embodiments, a user may have manually added the custom serializer to the registry. Then a servlet, such as the servlet initialized according to FIG. 1A above, initializes a serializer factory (processing block 123). Then the serializer factory instantiates the custom serializer (processing block 125). Finally, processing logic adds the custom serializer instantiated to a list accessible by the servlet so that the servlet may add the custom serializer instantiated to the third party library at runtime (processing block 127). In some embodiments, the servlet may call the custom serializer at runtime to convert data into a predetermined format consumable by the servlet. As such, automation scripts may be executed by the servlet to perform various administrative tasks in bulk because data in formats inconsumable by the servlet may be converted to the predetermined format consumable by the servlet by calling the custom serializer.

FIG. 1C illustrates one embodiment of a method to automate administrative tasks in a networked environment. The method may be performed by processing logic that may comprise hardware (e.g., circuitry, dedicated logic, programmable logic, microcode, etc.), software (such as instructions run on a processing device), firmware, or a combination thereof. For example, the processing module 220 of the centralized server 200 shown in FIG. 2 may perform at least part of the method.

Processing logic executes an automation script from a user (e.g., an administrator) to perform an administrative task on multiple computing machines within a networked system without user intervention (processing block 130). Details of one embodiment of the networked system are discussed below with reference to FIG. 3. In response to instructions in the automation script, processing logic calls a custom serializer to serialize a data object such that the serialized data object can be consumed by RPCs of the API (processing block 135). Details of one embodiment of registering the custom serializer and making it available to the servlet are described above. In some embodiments, the RPCs include XML-RPCs that allow distinct pieces of software in disparate systems to make RPCs using XML over HTTP.

FIG. 2 illustrates a functional block diagram of one embodiment of a centralized server usable in a networked system in some embodiments. One embodiment of the networked system is discussed in details below with reference to FIG. 3. Referring to FIG. 2, the centralized server 200 includes a processing module 220, an internal network interface 230, an external network interface 240, a serializer registry 250, and a computer-readable medium accessing device 260, which are coupled to each other via a bus system 270. The processing module 220 further includes a servlet 221 and a library 223, which contains a custom serializer 225.

In some embodiments, the centralized server 200 is communicatively coupled to an internal network of a customer of a software vendor via the internal network interface 230. The internal network further includes one or more physical computing machines of the customer, such as servers, workstations, desktop personal computers, laptops, etc. The centralized server 200 is further coupled to an external network, such as the Internet, via the external network interface 240. The external network interface 240 may establish a secured connection to access an external server provided by the software vendor (such as the external server 370 in FIG. 3) to retrieve various contents from the external server, such as metadata of an operating system, information on provisioning virtual hosts and virtual guests, application upgrades, etc. These contents retrieved may be stored or cached locally on the centralized server 200 or on a storage device (e.g., the database 312 in FIG. 3) within the internal network.

Alternatively, the centralized server 200 may obtain the contents from the external server via a portable computer-readable storage medium 265 removably coupled to the computer-readable medium accessing device 260. Some examples of the computer-readable storage medium 265 and computer-readable storage medium accessing device 260 include a CD and a CD-ROM drive, a flash memory card with a Universal Serial Bus (USB) connector and a USB drive, etc. The external server of the software vendor may store the contents onto the computer-readable storage medium 265, which is then delivered to the customer for the centralized server's 200 use.

In some embodiments, the centralized server 200 maintains and manages software licensed to the customer. As such, an administrator of the customer's internal network may use the centralized server 200 to perform various administrative tasks in the internal network. Because many administrative tasks are routine and repetitive, the administrator may write automation scripts to automate such administrative tasks in order to save time and effort. To allow the centralized server 200 to work with the automation scripts, the administrator may register a custom serializer 225 in a serializer registry. In some embodiments, invocation handlers may be registered with the serializer registry as well. Further, the servlet 221 may invoke a serializer factory, which instantiates the custom serializer. Then the servlet 221 may add the instantiated custom serializer 225 to the library 223 at runtime. When the servlet 221 executes an automation script, the servlet 221 may call the custom serializer 225 to serialize data to make the data consumable by the servlet 221. As such, the servlet 221 may perform the administrative tasks on one or more computing machines without user intervention according to instructions in the automation script. In other words, the administrative tasks may be automated by the servlet 221.

Figure 3:
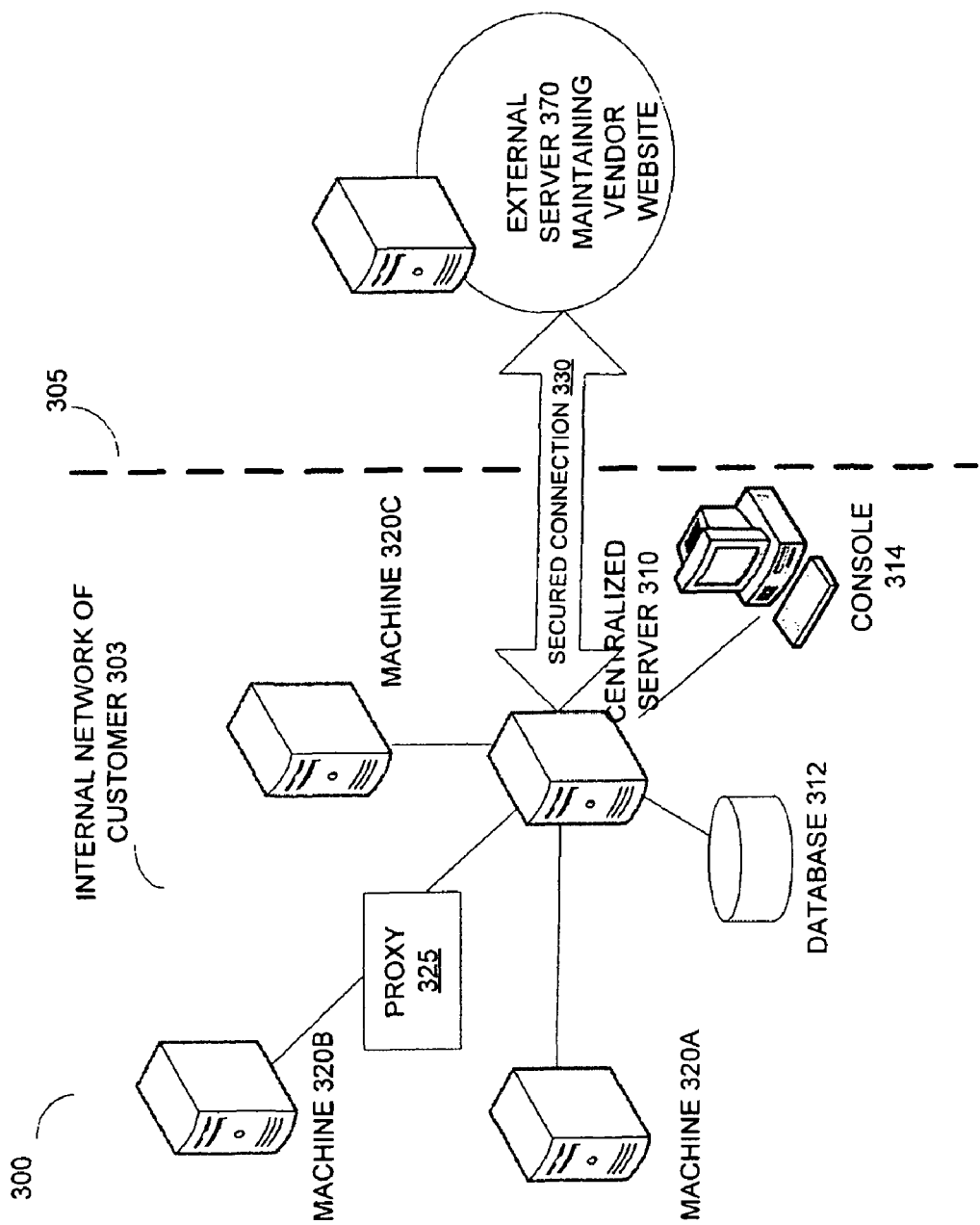
FIG. 3 illustrates one embodiment of a system in which embodiments of the present invention may be implemented.

FIG. 3 illustrates one embodiment of a system in which embodiments of the present invention may be implemented. The system 300 includes an external server 370 maintained by a software vendor and an internal network 303 of a customer of the software vendor, coupled to each other via a secured connection 330, such as a virtual private network (VPN) over a public network (e.g., the Internet). Thus, the system 300 may be referred to as a connected setup. Alternatively, the external server 370 and the internal network 303 may not be communicably coupled to each other. Rather, data and information may be loaded onto portable computer-readable storage media, such as compact discs (CDs), flash memory cards with USB connectors, etc. The portable computer-readable storage media is then delivered to the customer's site to be loaded onto a centralized server within the internal network. As such, this system may be referred to as a disconnected setup.

In some embodiments, the internal network 303 of the customer further includes components shown on the left side of the dotted line 305. As illustrated in FIG. 3, the internal network 303 of the customer includes a centralized server 310, a number of computing machines 320A-320C, a database 312, and a console 314. The computing machines 320A-320C are physical hardware, such as servers, workstations, desktop personal computers (PCs), laptops, etc. The computing machines 320A-320C, the console 314, and the database 312 are coupled to the centralized server 310 within the internal network 303. In some embodiments, one or more of the customer's computing machines may be coupled to the centralized server 310 via a proxy, such as the proxy 325 between the computing machine 320B and the centralized server 310. The proxy 325 may cache software packages to enhance performance, speed up downloads, and offload some of the operations from the centralized server 310.

In some embodiments, the centralized server 310 provides an API having a set of extended capabilities to allow a servlet running on the centralized server 310 to better integrate with other scripts and/or programs. Specifically, the API may include a custom data converter to convert data into a predetermined format consumable by the servlet, such as a custom serializer. Details of the centralized server 310 and the custom serializer have been described above.

Referring back to FIG. 3, the internal network 303 includes a local area network (LAN) protected from unauthorized access. For instance, a firewall may be employed at a gateway or proxy of the LAN to prevent unauthorized access to the LAN. Through the secured connection 330, the centralized server 310 within the internal network 303 may access the external server 370 external to the internal network 303. For example, the external server 370 may host a website of the software vendor and the centralized server 310 may establish the secured connection 330 to the website using one or more Internet security protocol (e.g., secure socket layer (SSL), secure shell (SSH), transport layer security (TLS), etc.). Thus, the centralized server 310 may securely retrieve or download various contents from the external server 370, such as contents that are available only by purchase and/or license (e.g., metadata of an operating system, such as Red Hat Enterprise Linux provided by Red Hat, Inc. of Raleigh, N.C., information on provisioning, executables of client applications, etc.). The contents retrieved are stored locally within the customer's internal network 303. In one embodiment, the contents retrieved are stored in a storage device internal to the centralized server 310. Alternatively, the contents retrieved may be stored in the database 312 coupled to the centralized server 310 within the internal network 303. Alternatively, the contents retrieved may be stored in a Network-Attached Storage (NAS) device. After downloading the contents from the external server 370, the centralized server 310 may terminate the secure connection 330 such that no talk back to the external server 370 is allowed. As such, the above approach allows the customer to take the customer's system off the external network (e.g., the Internet), and hence, providing more optimization, flexibility, and control of the system to the customer.

The centralized server 310 may synchronize with the external server 370 by checking with the external server 370 for updates and/or changes to the contents retrieved previously. Such synchronization may be performed periodically and/or in response to user requests. Alternatively, the external server 370 may notify the centralized server 310 when there are changes and/or updates to the contents previously provided to the centralized server 310. When there is a change to the contents previously retrieved, the centralized server 310 may retrieve the change from the external server 370 and then update a copy of the contents on the centralized server 310 accordingly, or the centralized server 310 may simply retrieve an updated version of the contents to replace the previously retrieved version. In some embodiments, synchronization is performed via one or more channels within the secured connection 330 between the centralized server 310 and the external server 370. A channel as used herein refers to a collection of software packages organized into a logical grouping. For example, the set of packages that make up an operating system is organized into a channel in some embodiments. Different types of contents may be associated with different channels such that the centralized server 310 may choose to synchronize a subset of the channels as needed. For example, information related to provisioning virtual hosts and virtual guests may be associated with a Tool channel.

Alternatively, the centralized server 310 may synchronize with the external server 370 via portable computer-readable storage media, such as CDs, DVDs, flash memory cards with USB connectors, etc. When there is a change to content previously provided to the centralized server 310, the change to the content or an updated version of the content may be stored onto the computer-readable storage media from the external server 370. Then the computer-readable storage media may be delivered to the customer, who would provide the computer-readable storage media to the centralized server 310. By providing the computer-readable storage media to the centralized server 310, the centralized server 310 obtains the updated content, such as the metadata and information, from the computer-readable storage media and subsequently, and uses the updated content to manage the computing machines 320A-320C as well as the virtual hosts and virtual guests provisioned on the computing machines 320A-320C.

Figure 4:
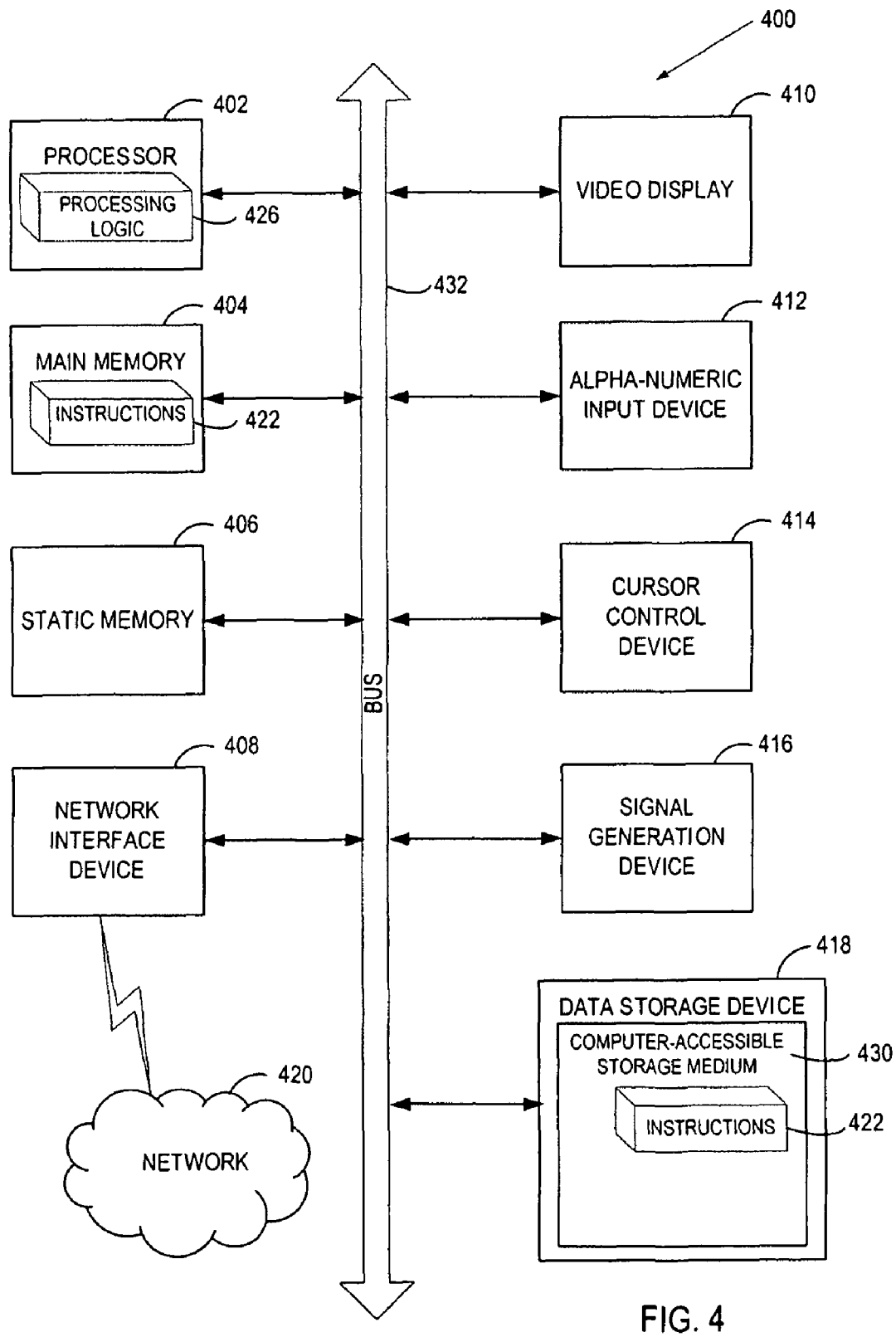
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a machine-readable storage medium or a computer-readable medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the computer-accessible storage medium 430 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the computer and that cause the machine to perform any one or more of the methodologies of the present invention. The term "computer-accessible storage medium" shall accordingly be taken to include, but not be limited to, solid-state memories, optical and magnetic media, etc.

Thus, some embodiments of API enhancement in a networked system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   initializing a servlet to run on a centralized management server, wherein the centralized management server manages one or more computing machines that are coupled to the centralized management server; and
   expanding, by the centralized management server, capabilities of an application programming interface (API) accessible by a client of the centralized management server to allow the client to have data converted to a predetermined format when executing an automation script in order to perform an administrative task on multiple computing machines without user intervention.

2. The method of claim 1, wherein expanding the capabilities of the API further comprises:
   retrieving a custom serializer from a serializer registry; and
   registering the custom serializer with a library accessible by the servlet.

3. The method of claim 1, further comprising:
   the servlet invoking a serializer factory;
   the serializer factory instantiating an object of a custom serializer;
   adding the object instantiated to a list accessible by the servlet; and
   the servlet using the list to add the object of the custom serializer to a library at runtime.

4. The method of claim 1, further comprising:
   executing the automation script; and
   the servlet calling a custom serializer to serialize a data object in response to instructions in the automation script.

5. The method of claim 1, wherein the API is based on extended markup language remote procedure calls (XML-RPCs).

6. The method of claim 1, further comprising:
   registering one or more invocation handlers with a library.

7. An apparatus comprising:
an internal network interface to couple to a plurality of computing machines within an internal network of a customer of a software vendor;
a processing module to execute a servlet and manage the plurality of computing machines; and
a library in which a custom serializer is registered to allow the servlet to access the custom serializer, in response to instructions in an automation script, in order to perform an administrative task on the plurality of computing machines without user intervention.

8. The apparatus of claim 7, further comprising:
a serializer registry from which the custom serializer is retrieved.

9. The apparatus of claim 7, wherein the servlet is operable to invoke a serializer factory to instantiate the custom serializer, wherein the servlet is further operable to add the instantiated custom serializer to the library at runtime.

10. The apparatus of claim 7, wherein the custom serializer is called to serialize a data object in response to executing the automation script.

11. The apparatus of claim 7, further comprising an application programming interface (API) based on extended markup language remote procedure calls (XML-RPCs).

12. The apparatus of claim 7, wherein the library further comprises invocation handlers registered.

13. The apparatus of claim 7, further comprising:
a centralized management server, wherein the processing module and the network interface are implemented within the centralized management server.

14. The apparatus of claim 13, further comprising an external network interface to couple to an external server provided by the software vendor via an external network.

15. A non-transitory computer-readable medium embodying instructions that, when executed by a processing device will cause the processing device to perform operations comprising:
initializing, by the processing device, a servlet on a centralized management server, wherein the centralized management server manages one or more computing machines that are coupled to the centralized management server; and
expanding, by the centralized management server, capabilities of an application programming interface (API) accessible by a client of the centralized management server to allow the client to have data converted to a predetermined format when executing an automation script in order to perform an administrative task on multiple computing machines without user intervention.

16. The non-transitory computer-readable medium of claim 15, wherein expanding the capabilities of the API further comprises:
retrieving a custom serializer from a serializer registry; and
registering the custom serializer with a library accessible by the servlet.

17. The non-transitory computer-readable medium of claim 15, wherein the operations further comprise:
the servlet invoking a serializer factory;
the serializer factory instantiating an object of a custom serializer;
adding the object instantiated to a list accessible by the servlet; and
the servlet using the list to add the object of the custom serializer to a library at runtime.

18. The non-transitory computer-readable medium of claim 15, wherein the operations further comprise:
executing the automation script; and
the servlet calling a custom serializer to serialize a data object in response to instructions in the automation script.

19. The non-transitory computer-readable medium of claim 15, wherein the API is based on extended markup language remote procedure calls (XML-RPCs).

20. The non-transitory computer-readable medium of claim 15, wherein the operations further comprise:
registering one or more invocation handlers with a library.

* * * * *